(12) United States Patent
Xiong et al.

(10) Patent No.: US 11,622,337 B2
(45) Date of Patent: Apr. 4, 2023

(54) POWER ALLOCATION IN NEW RADIO AND LONG TERM EVOLUTION DUAL CONNECTIVITY

(71) Applicant: Apple Inc., Cupertino, CA (US)

(72) Inventors: Gang Xiong, Portland, OR (US); Hong He, Sunnyvale, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/282,735

(22) PCT Filed: Oct. 4, 2019

(86) PCT No.: PCT/US2019/054654
§ 371 (c)(1),
(2) Date: Apr. 2, 2021

(87) PCT Pub. No.: WO2020/072877
PCT Pub. Date: Apr. 9, 2020

(65) Prior Publication Data
US 2022/0007308 A1    Jan. 6, 2022

Related U.S. Application Data

(60) Provisional application No. 62/742,039, filed on Oct. 5, 2018.

(51) Int. Cl.
| | |
|---|---|
| *H04W 52/36* | (2009.01) |
| *H04W 72/04* | (2009.01) |
| *H04W 76/15* | (2018.01) |
| *H04W 52/34* | (2009.01) |
| *H04W 72/0446* | (2023.01) |

(52) U.S. Cl.
CPC ....... *H04W 52/367* (2013.01); *H04W 52/346* (2013.01); *H04W 72/0446* (2013.01); *H04W 76/15* (2018.02)

(58) Field of Classification Search
CPC . H04W 52/367; H04W 76/15; H04W 52/346; H04W 72/0446; H04W 52/38; H04W 76/16
See application file for complete search history.

(56) References Cited

U.S. PATENT DOCUMENTS

2016/0295522 A1    10/2016    Quin et al.
2016/0353389 A1*   12/2016    Wang ................. H04W 52/325
(Continued)

FOREIGN PATENT DOCUMENTS

EP    3098975 A1    11/2016
EP    3 346 771 A1   7/2018

OTHER PUBLICATIONS

International Search Report directed to related International Patent Application PCT/US2019/054654, dated Jan. 23, 2020.
(Continued)

*Primary Examiner* — John J Lee
(74) *Attorney, Agent, or Firm* — Sterne, Kessler, Goldstein & Fox P.L.L.C.

(57) ABSTRACT

Embodiments of the present disclosure describe methods, apparatuses, storage media, and systems for determining dynamic power sharing in a dual connectivity network. Other embodiments may be described and claimed.

20 Claims, 8 Drawing Sheets

(56) References Cited

U.S. PATENT DOCUMENTS

2019/0149365 A1* 5/2019 Chatterjee ............ H04L 5/0044
                                                    370/329
2021/0321421 A1* 10/2021 Osawa ................. H04W 72/10

OTHER PUBLICATIONS

Huawei et al., 'Discussion on UL maximum time difference for EN-DC' R4-1807284, 3GPP TSG-RAN WG4 Meeting #87, Busan, Korea,May 14, 2018 See section 7.6.1.

3GPP; TSG RAN; Evolved Universal Terrestrial Radio Access (E-UTRA); Physical layer procedures (Release 15)', 3GPP TS 36.213 V15.3.0, Oct. 1, 2018 See sections 5.1.2.1, 5.1.4.

Ericsson, 'Configured maximum power for inter-band EN-DC', R4-1812034, 3GPP TSG-RAN Meeting #88bis, Chengdu, China, Sep. 26, 2018 See section 6.2B.4.

Supplementary Partial European Search Report, dated May 19, 2022, European Patent App. No. 19868991.1, 14 pages.

Extended European Search Report, dated Aug. 22, 2022, European Patent App. No. 19868991.1, 13 pages.

Huawei, Hsilicon, "Remaining issues on LTE-NR coexistence," 3GPP TSG RAN WG1 Meeting #94bis, R1-1810114, Chengdu, China, Oct. 8-12, 2018, 6 pages.

European Search Report directed to related European Application No. 22197533.7, dated Nov. 4, 2022; 12 pages.

Intel Corporation, "Further discussion on NR-LTE co-existence", 3GPP Draft; R1-1812474, 3rd Generation Partnership Project (3GPP), Mobile Competence Centre; 650, Route Des Lucioles; F-06921 Sophia-Antipolis Cedex; France, vol. RAN WG1, no. Spokane, USA, Nov. 11, 2018; 5 pages.

* cited by examiner

POWER ALLOCATION IN NEW RADIO AND LONG TERM EVOLUTION DUAL CONNECTIVITY

CROSS REFERENCE TO RELATED APPLICATION

This application is a national phase entry of PCT/US2019/054654, filed on Oct. 4, 2019, which claims priority to U.S. Provisional Patent Application No. 62/742,039, filed Oct. 5, 2018, entitled "Power Allocation in NR and LTE Dual Connectivity Scenarios," the entire disclosure of both of which are hereby incorporated by reference in their entireties.

FIELD

Embodiments of the present invention relate generally to the technical field of wireless communications.

BACKGROUND

In Third Generation Partnership Project (3GPP) Release 15 New Radio (NR), Long Term Evolution-NR dual connectivity (DC) was approved to be supported as an alternative to achieve ultra-high per-user throughput demands from a mobile network. A user equipment (UE) configured with DC may be connected simultaneously to two evolved node Bs (eNBs, including a master eNB (MeNB) and a secondary eNB (SeNB), which may operate on different carrier frequencies and may be interconnected by traditional backhaul links (known as an X2 interface in accordance with the LTE terminology). These X2-based backhauls are non-ideal in practice, being characterized by a certain latency and limited capacity.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. Other embodiments may be utilized and structural or logical changes may be made without departing from the scope of the present disclosure. Therefore, the following detailed description is not to be taken in a limiting sense.

The description may describe various operations as multiple discrete actions or operations in turn, in a manner that is most helpful in understanding the claimed subject matter. However, the order of description does not imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" mean (A), (B), or (A and B). For the purposes of the present disclosure, the phrases "A, B, or C" and "A, B, and/or C" mean (A), (B), (C), (A and B), (A and C), (B and C), or (A, B, and C).

Figure 1:
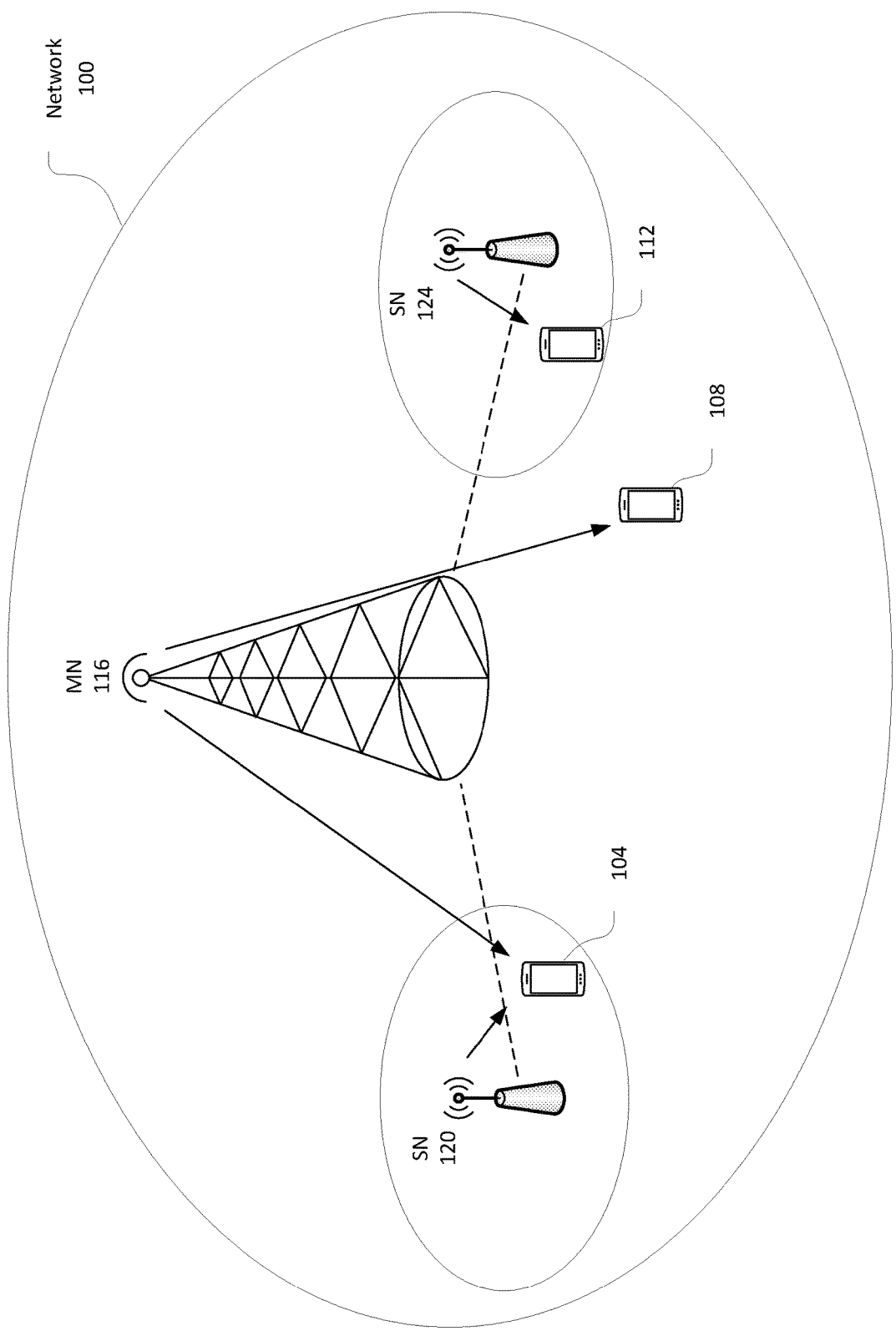
FIG. 1 schematically illustrates an example of a dual-connectivity network in accordance with various embodiments.

FIG. 1 illustrates a multi-radio access technology dual connectivity (MR-DC) network 100 in accordance with some embodiments. The MR-DC network 100 may include a plurality of UE's including, for example, UE 104, UE 108, and UE 112. Each of the UEs may include multiple reception (Rx)/transmission (Tx) capabilities and may be configured to utilize radio resources provided by two distinct schedulers in two different nodes connected via non-ideal backhaul, one providing Evolved Universal Terrestrial Radio Access (E-UTRA) access and the other one providing NR access. One scheduler is located in a master node (MN) 116 and another in a secondary node (SN), for example, SN 120 or SN 124. The MN 116 may provide one or more cells that are part of a master cell group (MCG), and each of the SN 120 and SN 124 may provide respective cells that are part of respective secondary cell groups (SCGs). The MN 116 may connect with the SNs 120 and 124 via a network interface (for example, an X2-based interface) and at least the MN 116 may be connected to the core network.

The MR-DC network 100 may include, but is not limited to, E-UTRA—NR Dual Connectivity (EN-DC), NG-RAN-E-UTRA-NR Dual Connectivity (NGEN-DC), and NR-E-UTRA Dual Connectivity (NE-DC). In an EN-DC network or communication, a UE may be connected to one eNB or ng-eNB that acts as the MN 116 and one next generation NodeB (gNB) that acts as an SN, for example, SN 120 or SN 124. An ng-eNB may be an enhanced eNodeB that connects to the 5G Core network via the next generation (NG) interfaces but still uses LTE air interfaces to communicate with a 5G UE. So, both the gNB and ng-eNB use the new NG interfaces toward the 5G Core but use different radio interfaces towards the UE. Note that "eNB" may indicate either an eNB or ng-eNB in embodiments herein. The eNB is connected to an evolved packet core (EPC) and the gNB is connected to the eNB. The gNB may be a node that provides NR user-plane and control-plane protocol terminations towards the UE, and acts as the SN in an EN-DC.

In an NE-DC network or communication, by contrast, a UE may be connected to one gNB that acts as the MN 116 and one eNB that acts as an SN, for example, SN 120 or SN 124. The gNB is connected to a 5G Core (5GC) and the eNB is connected to the gNB via the Xn interface.

In a dual-uplink EN-DC or NE-DC network, a UE may transmit one or more LTE uplink signals and one or more NR uplink signals in an intra-band or inter-band DC operation. To simplify descriptions in this disclosure, embodiments may only refer to one LTE signal and one NR signal.

However, the various embodiments herein may be applicable to more than one LTE uplink signal or NR uplink signal. In a dynamic power sharing (DPS) dual-uplink EN-DC or NE-DC network, a transmission (Tx) power of an LTE uplink and a Tx power of an NR uplink may be determined jointly and dynamically in accordance with certain transmitting requirements for a UE. Various embodiments describe how to efficiently share power between the LTE and NR systems in case of parallel transmissions taking into account scheduling latency difference between LTE and NR.

As used herein, an "uplink signal" may refer to any control or data information transmitted (or to be transmitted) in an uplink communication including, but not limited to, physical channels (physical uplink control channel (PUCCH), physical uplink shared channel (PUSCH), physical random access channel (PRACH), etc.) and physical signals (for example, sounding reference signal, uplink reference signal, etc.).

Some embodiments determine a transmission power of LTE and NR uplinks and a power headroom report in EN-DC or NE-DC scenarios. Some embodiments include determining types of NR slots and LTE subframes, and determining maximum transmission powers of NR/LTE based on the subframes/slot types and scaling factors configured by higher layers.

Certain aspects of the present disclosure provide techniques for determining the transmission power for LTE and 5G NR if a UE is configured with an MCG using E-UTRA radio access and with a SCG using NR radio access (also known as EN-DC architecture or option 3) or vice versa (also known as NE-DC architecture or option 4). This may be especially useful in case of an uplink power limitation. In addition, embodiments further describe techniques for power sharing and power headroom reporting in EN-DC or NE-DC operation.

Figure 2:
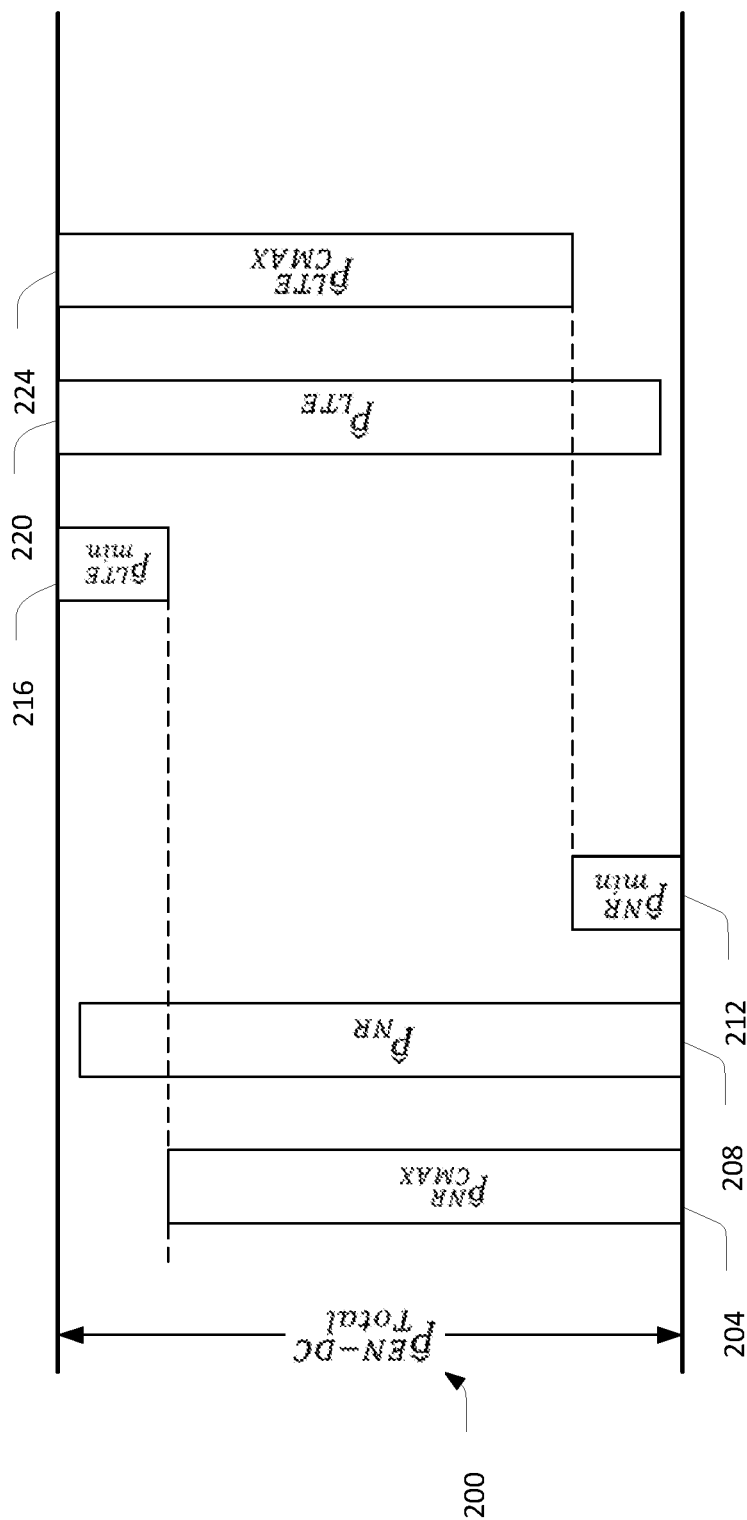
FIG. 2 illustrates power control parameters in accordance with various embodiments.

According to some aspects of the present disclosure, an access node (for example, MN or SN) may configure a UE with a set of power control parameters for transmission power determinations. The power control parameters are graphically illustrated in FIG. 2 in accordance with some embodiments and may include the following.

A maximum power, $P_{LTE}$, which is a maximum transmit power used for the MCG in EN-DC and for the SCG in NE-DC.

A maximum power, $P_{NR}$, which is used by UE as a maximum transmission power for the SCG in EN-DC and for the MCG in NE-DC.

$\hat{P}_{NR} + \hat{P}_{LTE} \geq \hat{P}_{Total}^{EN-DC}$, where $\hat{P}_{NR}$ 208 is a linear value of $P_{NR}$ and $\hat{P}_{LTE}$ 220 is a linear value of $P_{LTE}$. In some designs, $\hat{P}_{Total}^{EN-DC}$ 200 may be a total uplink transmit power of EN-DC network and may be jointly determined based on the power class $P_{powerClass}$ and a maximum power $P_{EMAX}^{EN-DC}$ configured by RRC signaling as follows: $\hat{P}_{Total}^{EN-DC} = \min(P_{EMAX}^{EN-DC}, P_{powerClass})$.

The same approach may be also applied for $\hat{P}_{Total}^{NE-DC}$ in an NE-DC architecture.

An LTE scaling factor, $\gamma_{LTE}$, and an NR scaling factor, $r_{NR}$, may be configured where $0 \leq \gamma_{LTE} \leq 1$ or $0 \leq r_{NR} \leq 1$ or both. The scaling factors may be semi-statically configured by higher layers among a set of predefined values relative to $\hat{P}_{LTE}$ and $\hat{P}_{NR}$ respectively, which may be used for determining power allocation for EN-DC or NE-DC. Alternatively, this may be defined relative to $\hat{P}_{Total}^{EN-DC}$ 200 in FIG. 2 for calculating a minimum guaranteed transmission power $\hat{P}_{min}^{NR}$ 212 and $\hat{P}_{min}^{LTE}$ 216 for NR and LTE, respectively. Four alternatives for determining the minimum transmission powers include:

$$\hat{P}_{min}^{NR} = \gamma_{NR} \cdot \hat{P}_{Total}^{EN-DC} \quad \text{(Alternative-1);}$$

$$\hat{P}_{min}^{NR} = \gamma_{NR} \cdot \hat{P}_{NR} \quad \text{(Alternative-2);}$$

$$\hat{P}_{min}^{LTE} = \gamma_{LTE} \cdot \hat{P}_{Total}^{EN-DC} \quad \text{(Alternative-3); and}$$

$$\hat{P}_{min}^{LTE} = \gamma_{LTE} \cdot \hat{P}_{LTE} \quad \text{(Alternative-4).}$$

In embodiments, a UE operating in NE-DC network may dynamically determine a maximum available transmit power of the UE for the NR, $\hat{P}_{CMAX}^{NR}$ 204, or LTE, $\hat{P}_{CMAX}^{LTE}$ 224, at based on a slot type and a minimum guaranteed transmission power for NR, for example, $\hat{P}_{min}^{NR}$ 212, and LTE, for example, $\hat{P}_{min}^{LTE}$ 216.

In some embodiments, two types of uplink subframes (for LTE) or slots (for NR) are defined for NE-DC power allocation operations depending on whether there is potential for parallel uplink transmissions. The two types include Type-1 uplink subframe for LTE or Type-1 uplink slots for NR, and Type-2 uplink subframe for LTE or Type-2 uplink slots for NR.

Type-1 uplink subframe for LTE or Type-1 uplink slots for NR may include a type of uplink subframe/slot that is characterized by a possibility of parallel transmission(s) of the MCG and SCG, for example, the MCG/SCG uplink transmissions may be overlapped in time at least over one symbol. In some embodiments, the Type-1 subframe with potentially overlapped transmissions across cell groups (CGs) may be at least jointly determined based on the uplink (UL)/downlink (DL) configuration given by higher layers (for example, system information block 1 (SIB1)) for LTE frame structure type 2 and uplink slots by higher layer parameters TDD-UL-DLConfigurationCommon or TDD-UL-DL-ConfigDedicated for NR. Furthermore, Type-1 NR slots may include NR slots determined to potentially overlap based on DCI formats such as DCI format 2-0 and 0-0/0-1. In particular, Type-1 subframe for LTE (or Type-1 slot for NR) is a subframe (or a slot) that includes at least one symbol that is potentially overlapped with an uplink transmission of NR (or uplink transmission of LTE) in accordance to the aforementioned determination rule. In some other embodiments, the LTE Type-1 subframes or NR Type-1 slots may be explicitly configured through higher layers by an access node (for example, the MN 104, SN 108, or SN 112).

Type-2 uplink subframe for LTE or Type-2 uplink slots for NR differs from Type-1 subframes/slots as there is no parallel transmissions of LTE and NR on this type of subframe/slot. In other words, Type-2 uplink subframe in LTE or Type-2 uplink slot in NR may be fully overlapped with DL transmission of another RAT.

In some embodiments, the UE may always use $\hat{P}_{LTE}$ and $\hat{P}_{NR}$ as the maximum transmission power for Type-2 uplink subframe or Type-2 uplink slots. The following embodiments describe various options to determine the transmission power of Type-1 LTE uplink subframe and Type-1 NR uplink slot.

In one embodiment, a maximum LTE transmission power may be scaled down from $\hat{P}_{LTE}$ to $\hat{P}_{min}^{LTE}$ in order to borrow at least an amount of power $(1-\gamma_{LTE}) \cdot \hat{P}_{LTE}$ designed for the LTE uplink transmissions to the NR transmissions to ensure the RRC connection, which is maintained or transmitted by NR CCs in NE-DC architecture. Thus, the maximum transmission power of LTE uplink subframes may be determined by the following:

$$\hat{P}_{CMAX}^{LTE} = \begin{cases} \hat{P}_{min}^{LTE} & \text{Type-1 } LTE \text{ uplink subframes} \\ \hat{P}_{LTE} & \text{Type-2 } LTE \text{ uplink subframes} \end{cases}.$$

In some other embodiments, for an EN-DC network, a maximum transmission power of LTE for Type-1 subframe is reduced from $\hat{P}_{LTE}$ to $(\hat{P}_{Total}^{EN-DC} - \hat{P}_{min}^{NR})$ to provide a minimum power $\hat{P}_{min}^{NR}$ for Type-1 NR slot transmissions. Thus, the maximum transmission power of LTE uplink subframes may be determined by the following:

$$\hat{P}_{CMAX}^{LTE} = \begin{cases} \hat{P}_{Total}^{EN-DC} - \hat{P}_{min}^{NR} & \text{Type-1 } LTE \text{ uplink subframes} \\ \hat{P}_{LTE} & \text{Type-2 } LTE \text{ uplink subframes} \end{cases}.$$

According to certain aspects of the present disclosure, for an NE-DC network, the maximum transmission power of NR slots may be calculated using following equation:

$$\hat{P}_{CMAX}^{NR} = \begin{cases} \hat{P}_{Total}^{NE-DC} - \hat{P}_{SCG} & \text{Type-1 uplink slots} \\ \hat{P}_{NR} & \text{Type-2 uplink slots} \end{cases},$$

where $\hat{P}_{SCG} \leq \hat{P}_{CMAX}^{LTE}$ is an actual transmission power of SCG (for example, LTE CCs in NE-DC network) in overlapped portion between Type-1 subframes and slots so as to borrow all the leftover (for example, unused) power from the power designated for LTE transmission to the transmission of NR.

According to certain aspects, the UE may borrow or scale down a power designated for LTE transmission only if certain information is carried by the NR uplink transmission. The certain information may include radio resource control (RRC) connection messages, uplink control information (UCI) transmission, or specific physical channels, for example, sounding reference signal (SRS) or physical uplink control channel (PUCCH).

Figure 3:
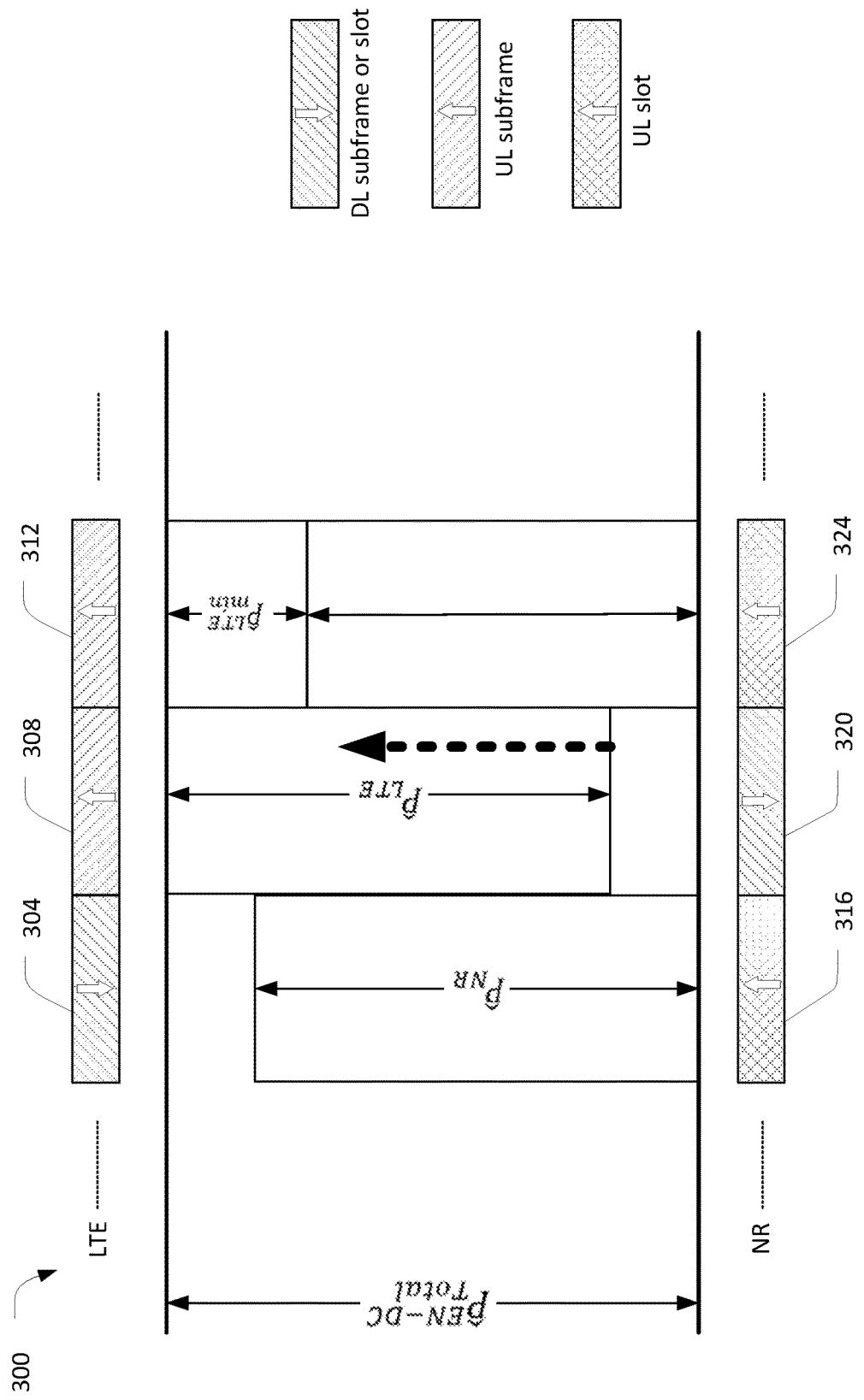
FIG. 3 illustrates a power-sharing operation in accordance with various embodiments.

FIG. 3 illustrates a power-sharing scheme 300 according to various embodiments. As shown, a UE may categorize the subframes of LTE and slots of NR as follows.

LTE subframe 308 may be determined to be a Type-2 uplink subframe because the overlapped NR slot 320 is a downlink and, therefore, there is no potential for overlapped uplink transmissions.

LTE subframe 312 may be determined to be a Type-1 uplink subframe because the overlapped NR slot 324 is an uplink and, therefore, there is potential for overlapped uplink transmissions.

NR slot 316 may be determined to be a Type-2 uplink slot because the overlapped LTE subframe 304 is a downlink and, therefore, there is no potential for overlapped uplink transmissions.

NR slot 324 may be determined to be a Type-1 uplink slot because the overlapped LTE subframe 312 is an uplink and, therefore, there is potential for overlapped uplink transmissions.

For Type-2 subframe 308 in LTE, the maximum transmission power may be $\hat{P}_{LTE}$. $\hat{P}_{NR}$ may be applied as the maximum transmission power for NR slot 316. While, for Type-1 subframe 312, the maximum transmission power may be scaled down from $\hat{P}_{LTE}$ to $\hat{P}_{min}^{LTE}$ to borrow some amount of powers for potential NR transmission power in Type-1 uplink slot 324.

In some embodiments, the UE may be allowed to drop an NR transmission or LTE transmission if a value of power scaling factor for LTE or NR is larger than a certain threshold due to a maximum power reduction (MPR) or the limitation of $\hat{P}_{CMAX}^{LTE}$ or $\hat{P}_{CMAX}^{NR}$. The power scaling factor may be defined as a ratio between a determined NR or LTE transmission power, based on, for example, the received DCI format 0-0 or 1-0 for NR or DCI format 0/4 for LTE (e.g., UL grants), and the actual available transmission power after performing MPR or the power cap $\hat{P}_{CMAX}^{LTE}$ and $\hat{P}_{CMAX}^{NR}$. More specifically, different values of power scaling factor may be defined for various uplink channels, including, for example, SRS, PUCCH, and PUSCH. In this manner, the scaling factors may be adapted to different physical channel structures of channels and various functionalities as well (for example, whether a channel supports HARQ operation or not). For example, some embodiments may avoid any scaling down for PUCCH and SRS transmission for beam management because a sub-optimal beam may be selected due to misalignment between gNB and UE. In various embodiments, the threshold may be broadcast by system information blocks (SIBs), e.g., SIB-x where x could be any integer, by selecting from a set of predefined values. Furthermore, UE may additionally be allowed to drop NR or LTE transmissions if a difference between power spectral density (PSD) of NR and that of LTE exceeds a predefined threshold.

Figure 4:
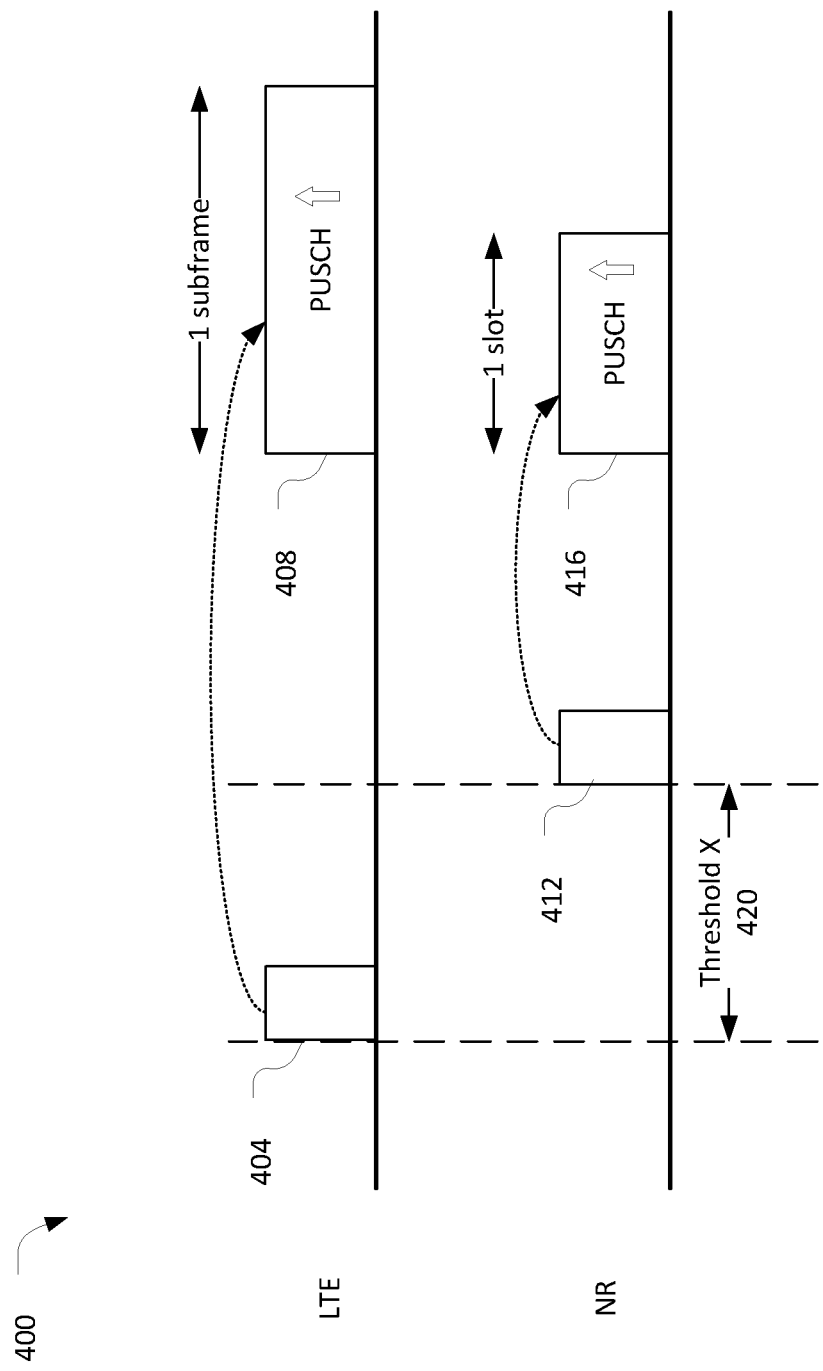
FIG. 4 illustrates a power-sharing operation in accordance with various embodiments.

FIG. 4 illustrates a power allocation scheme 400 based on timing differences in accordance with some embodiments. The power allocation scheme 400 may include an LTE PUSCH grant transmitted in DCI format 404. The DCI format 404 may schedule a corresponding PUSCH 408. The power allocation scheme 400 may further include an NR PUSCH grant transmitted in DCI format 412. The DCI format 412 may schedule a corresponding PUSCH 416.

In some embodiments, for both EN-DC and NE-DC, one UE capability may be introduced to indicate a maximum timing difference (threshold X) 420 between LTE DCI format 404 and NR DCI format 412 to jointly determine additional-MPR (A-MPR) of overlapped uplink transmissions in LTE (PUSCH 408) and in NR (PUSCH 416).

The uplink transmission power of PUSCH 408 in subframe n may be determined by taking into account the later NR uplink scheduling DCI format 412 transmitted in slot k (e.g., to derive corresponding transmission power of PUSCH 416) as long as the timing difference between DCI format 404 and NR UL grant (provided by DCI format 412) is less than threshold X 420. More specifically, 1-bit or 2-bit signaling may be introduced to allow UE to at least indicate whether the UE supports the following X values: X=Y−N2, wherein Y is a PUSCH scheduling latency in LTE and N2 is a UE processing capability for PUSCH preparation in NR, which may be reported as part of UE capability.

Figure 5:
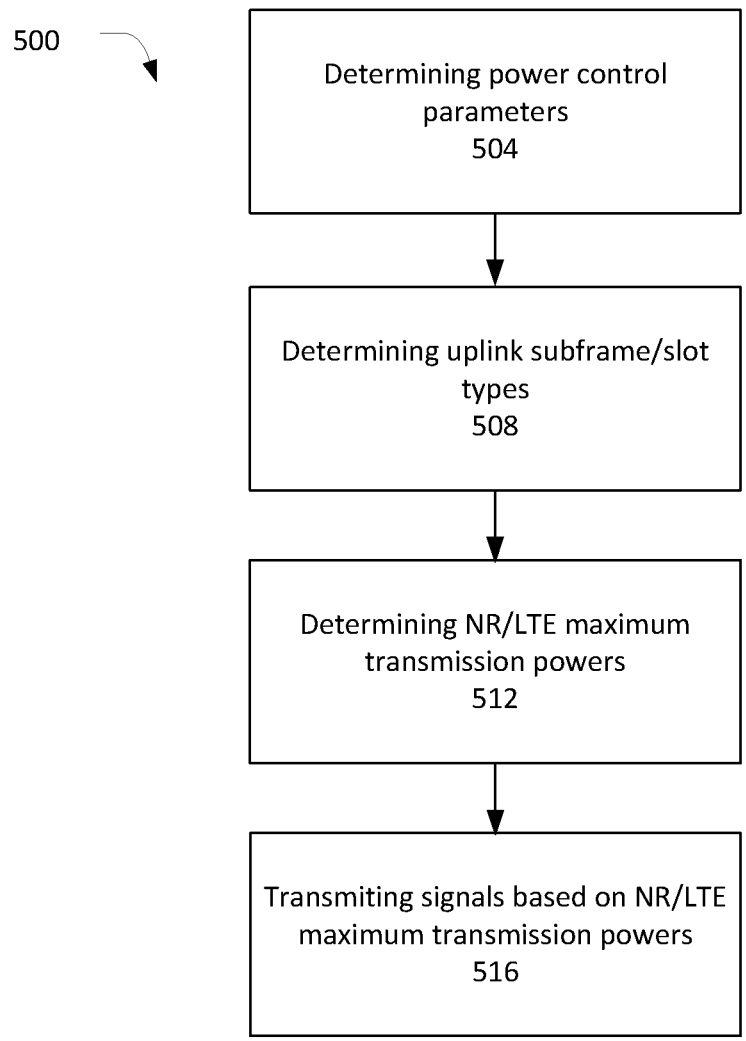
FIG. 5 illustrates an operation flow/algorithmic structure in accordance with various embodiments.

FIG. 5 illustrates an operation flow/algorithmic structure 500 in accordance with some embodiments. The operation flow/algorithmic structure 500 may be implemented by a user equipment such as, for example, UE 104, UE 108, or UE 112. In some embodiments, some or all of the aspects of operation flow/algorithmic structure 500 may be implemented by components of a user equipment such as, but not limited to, baseband circuitry.

The operation flow/algorithmic structure 500 may include, at 504, determining power control parameters. In some embodiments, the UE may be configured with the power control parameters from an access node (MN or SN). In some embodiments, the access node may configure the UE with the power control parameters using higher-layer signaling such as, for example, RRC signaling, DCI, or SIB.

The operation flow/algorithmic structure 500 may further include, at 508, determining uplink subframe/slot types. A subframe/slot type may be determined based on a potential for overlapping transmissions. For example, a subframe/slot may be determined to be a Type-1 subframe/slot if there is potential for overlapping uplink transmissions with transmissions from another cell group of the DC network. For another example, a subframe/slot may be determined to be a Type-2 subframe/slot if there is no potential for overlapping uplink transmissions with transmissions from another cell group of the DC network.

The operation flow/algorithmic structure 500 may further include, at 512, determining NR/LTE maximum transmission powers. The UE may determine the maximum transmission power to be used for an uplink transmission based on whether the subframe/slot is a Type-1 or a Type-2 subframe/slot. In some embodiments, the Type-2 subframes/slots may be transmitted with a full transmission power (as configured by an access node), while the Type-1 subframes/slots may be transmitted with a power backed off from the full transmission power. In some embodiments, only Type-2 subframes/slots in an SCG may be backed off, while Type-2 subframes/slots in an MCG may be transmitted with full transmission power.

The operation flow/algorithmic structure 500 may further include, at 516, transmitting signals based on the NR/LTE maximum transmission powers. The transmissions of the LTE subframes/NR slots may be made with full or back-off transmission powers as determined at 512. In some embodiments, if a backed-off transmission power does not satisfy a desired minimum transmission power, which may be based on content of transmission, channel in which the transmission is to be sent, etc., a transmission may be dropped altogether.

Figure 6:
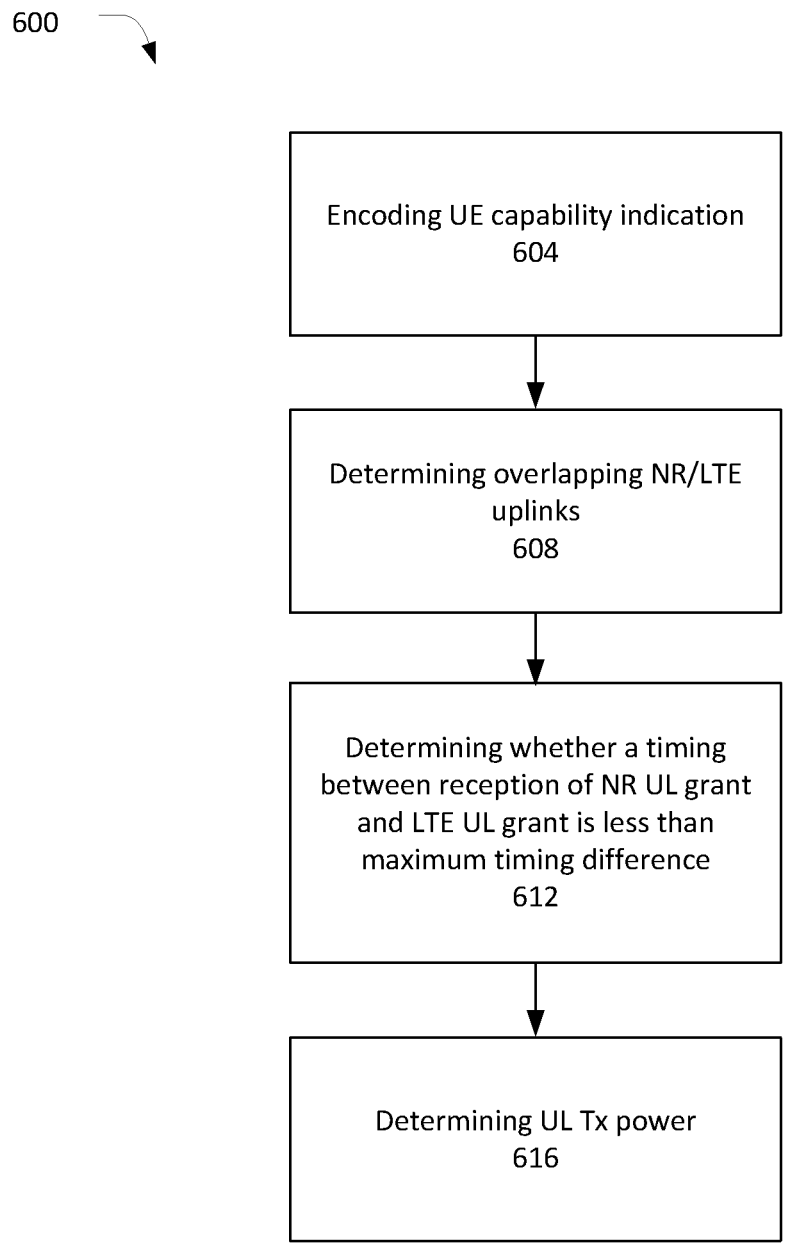
FIG. 6 illustrates an operation flow/algorithmic structure in accordance with various embodiments.

FIG. 6 illustrates an operation flow/algorithmic structure 600 in accordance with some embodiments. The operation flow/algorithmic structure 600 may be implemented by a user equipment such as, for example, UE 104, UE 108, or UE 112. In some embodiments, some or all of the aspects of operation flow/algorithmic structure 600 may be implemented by components of a user equipment such as, but not limited to, baseband circuitry.

The operation flow/algorithmic structure 600 may include, at 604, encoding a UE capability indication. The UE capability indication may be encoded in a message for transmission to an access node (for example, MN or SN). The UE capability indication may be one or two bits that indicate whether the UE supports a power allocation scheme based on timing differences of UL grants. In some embodiments, the UE capability indication may indicate whether the UE supports various predetermined timing thresholds. A predetermined timing threshold may correspond to a maximum timing difference discussed elsewhere herein.

The operation flow/algorithmic structure 600 may further include, at 608, determining overlapping NR/LTE uplinks. In this situation, the UE may determine that modification of at least one of the uplink transmissions is to be performed.

The operation flow/algorithmic structure 600 may further include, at 612, determining whether a timing between reception of an NR UL grant and an LTE UL grant is less than a predetermined threshold. The NR UL grant may be for an NR PUSCH and may be received in an NR DCI transmission. Similarly, the LTE UL grant may for an LTE PUSCH and may be received in an LTE DCI transmission.

The operation flow/algorithmic structure 600 may further include, at 616, determining uplink transmission power. In some embodiments, the uplink transmission power may be determined based on whether the timing determined at 612 is less than the predetermined timing threshold. For example, an LTE uplink transmit power may be determined based on the overlapping NR uplink if the timing is less than the predetermined timing threshold. Alternatively, the LTE uplink transmit power may be determined independently of the overlapping NR uplink if the timing is greater than the predetermined timing threshold.

In some embodiments, the UE may generate a power headroom report (PHR) to indicate an amount of available power. Similar to determination of the LTE uplink transmit power, the PHR may be determined based on the NR uplink if the timing is less than the predetermined timing threshold and may be determined independent of the NR uplink if the timing is greater than the predetermined timing threshold.

Figure 7:
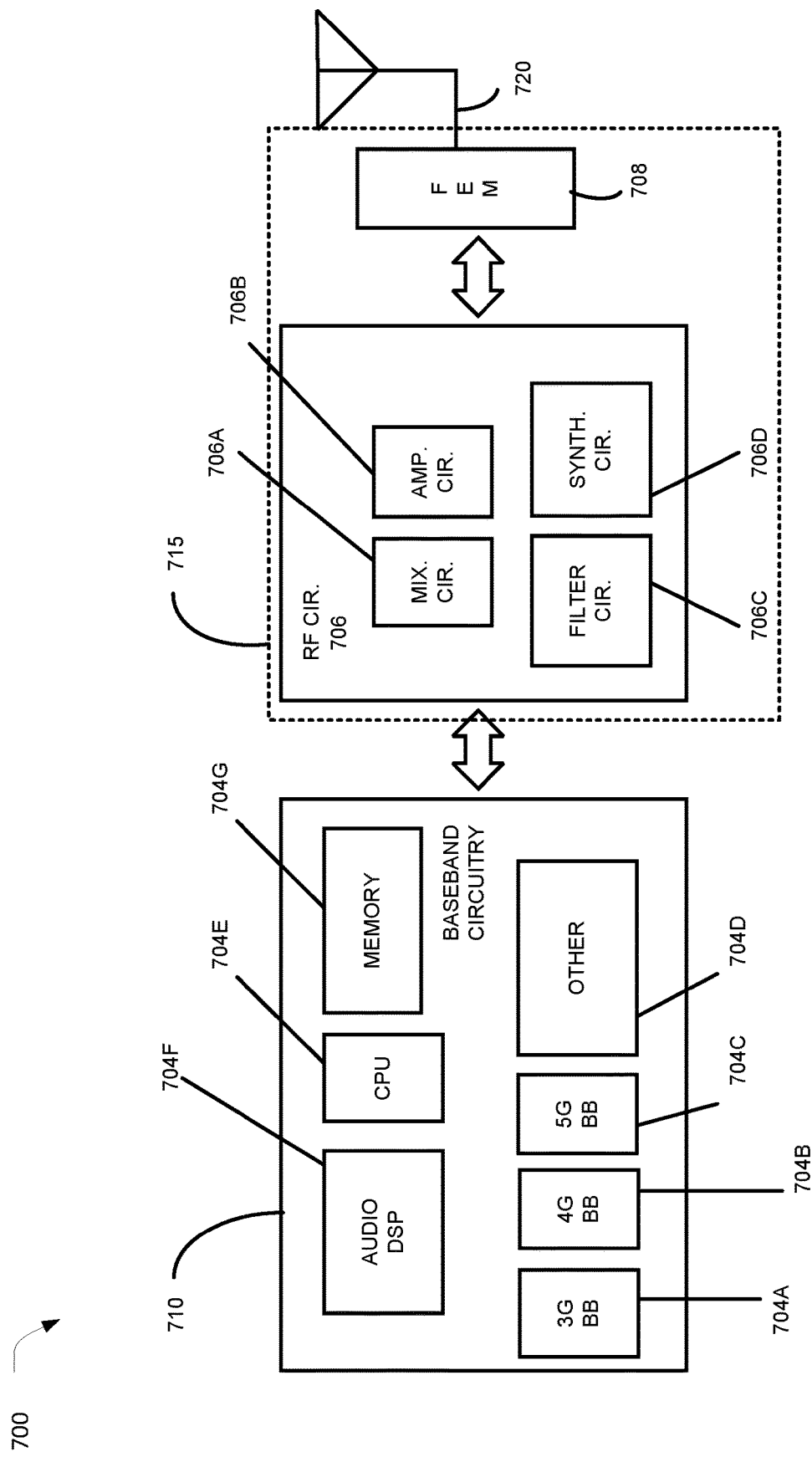
FIG. 7 illustrates an example device in accordance with various embodiments.

FIG. 7 illustrates a device 700 that includes baseband circuitry 710 and radio front end modules (RFEM) 715 in accordance with various embodiments. The device 700 may correspond to a UE (for example, UE 104, UE 108, or UE 112) or to an access node (for example MN 116, SN 120, or SN 124. As shown, the RFEMs 715 may include radio frequency (RF) circuitry 706, front-end module (FEM) circuitry 708, antenna array 711 coupled together at least as shown.

As used herein, the term "circuitry" may refer to, be part of, or include any combination of integrated circuits (for example, a field-programmable gate array (FPGA), an application specific integrated circuit (ASIC), etc.), discrete circuits, combinational logic circuits, system on a chip (SOC), system in a package (SiP), that provides the described functionality. In some embodiments, the circuitry may execute one or more software or firmware modules to provide the described functions. In some embodiments, circuitry may include logic, at least partially operable in hardware.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a central processing unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry; an RF circuitry interface to send/receive data to/from RF circuitry 706 of FIG. 7; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from a power management integrated circuit.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry XT106b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect. In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry depending on the desired output frequency. In some embodiments, a divider control input (e.g., N) may be determined from a look-up table based on a channel indicated by the application circuitry.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry XT106), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Figure 8:
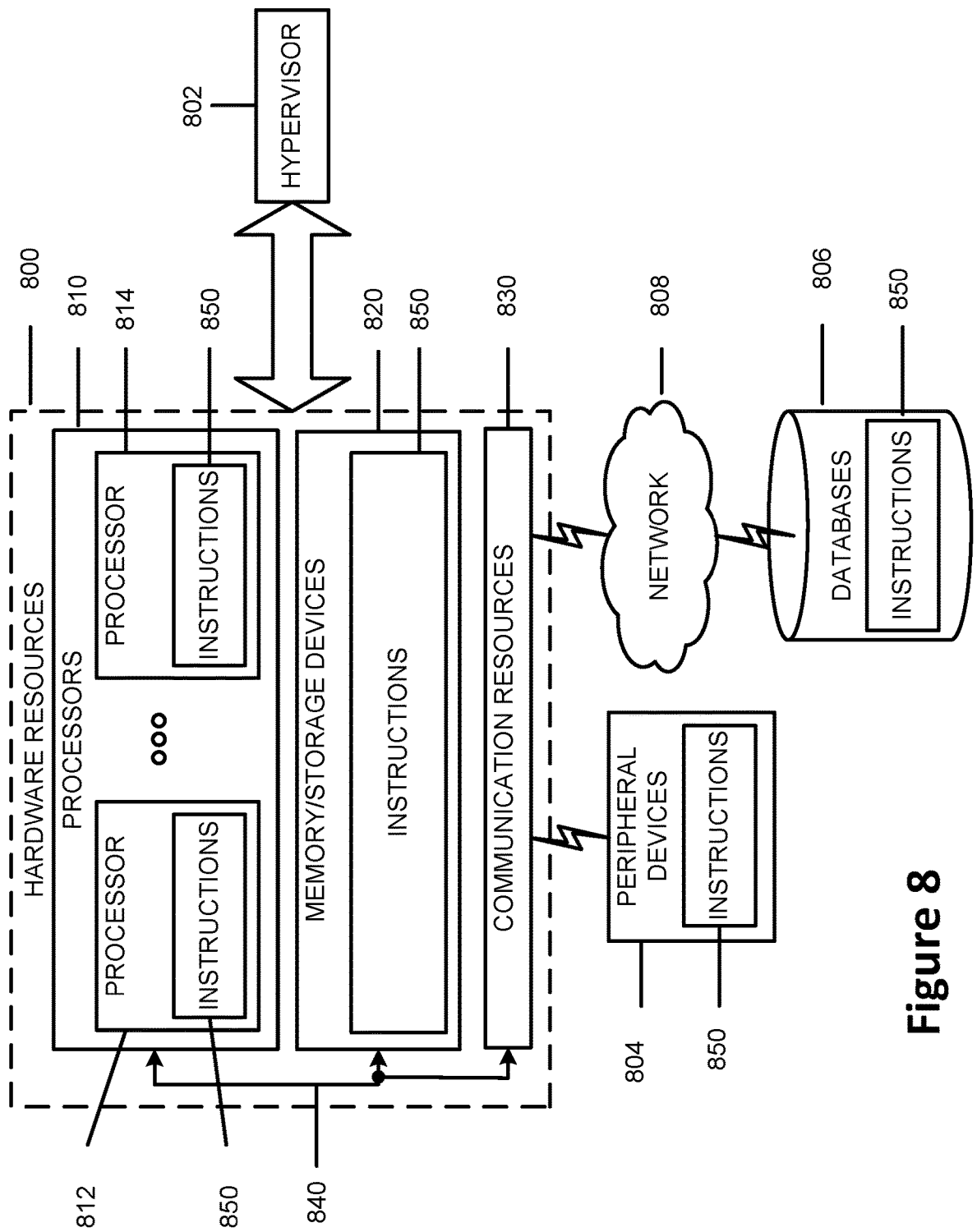
FIG. 8 illustrates hardware resources in accordance with various embodiments.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include a method of operating a UE, the method comprising: determining a set of power control parameters that includes a Long Term Evolution (LTE) maximum power ($P_{LTE}$) and a New Radio (NR) maximum power ($P_{NR}$); determining an uplink subframe type for an LTE subframe based on a potential of overlapping transmissions with an NR uplink signal of a dual connectivity (DC) network; determining an uplink slot type for an NR slot based on a potential of overlapping transmissions with an LTE uplink signal of the DC network; determining an NR maximum transmission power and an LTE maximum transmission power based on the uplink subframe type, uplink slot type, and the set of power control parameters; and transmitting, in the DC network, signals in the LTD subframe based on the LTE maximum transmission power, and the NR slot based on the NR maximum transmission power, wherein the DC network is an Evolved Universal Terrestrial Radio Access—New Radio dual connectivity (EN-DC) network or a New Radio—Evolved Universal Terrestrial Radio Access dual connectivity (NE-DC) network.

Example 2 may include the method of example 1 or some other example herein, wherein the uplink subframe type is a Type-1 uplink subframe if there is a potential of overlapping transmissions with the NR uplink signal, or a Type-2 uplink subframe if there is not a potential of overlapping transmissions with the NR uplink signal; and the uplink slot type is a Type-1 uplink slot if there is a potential of overlapping transmissions with the LTE uplink signal, or a Type-2 uplink slot if there is not a potential of overlapping transmissions with the LTE uplink signal.

Example 3 may include the method of example 2 or some other example herein, further comprising determining the uplink slot type is a Type-1 uplink slot based on a downlink control information (DCI) format 0_0, 0_1, or 2_0.

Example 4 may include the method of example 2 or some other example herein, further comprising determining the uplink subframe type is a Type-1 uplink subframe based on a determination that the LTE subframe includes at least one symbol that is potentially overlapped with the NR uplink signal; or the uplink slot type is a Type-1 uplink slot based on a determination that the NR slot includes at least one symbol that is potentially overlapped with the LTE uplink signal.

Example 5 may include the method of example 2 or some other example herein, further comprising determining the uplink subframe type is the Type-2 uplink subframe and further determine $\hat{P}_{LTE}$ as the maximum transmission power for the Type-2 uplink subframe based on said determination that the uplink subframe type is the Type-2 uplink subframe; or determining the uplink slot type is the Type-2 uplink slot and further determining $\hat{P}_{NR}$ as the maximum transmission power for the Type-2 uplink slot based on said determination that the uplink slot type is the Type-2 uplink slot.

Example 6 may include the method of example 1 or some other example herein, further comprising determining the uplink subframe type or uplink slot type based on an uplink/downlink configuration given by higher-layer signaling for an LTE frame structure or based on uplink slots indicated by higher-layer parameters TDD-UL-DLConfigurationCommon or TDD-UL-DL-ConfigDedicated for an NR frame structure.

Example 7 may include the method of example 1 or some other example herein, further comprising determining the uplink subframe type or uplink slot type based on explicit subframe/slot type signaling from an access node.

Example 8 may include the method of example 2 or some other example herein wherein the uplink subframe type is the Type-1 uplink subframe and the uplink slot type is the Type-1 uplink slot and the method further comprises: determining the LTE maximum transmission power for the Type-1 uplink subframe.

Example 9 may include the method of example 8 or some other example herein, further comprising determining the NR maximum transmission power for the Type-1 uplink slot based on the LTE maximum transmission power.

Example 10 may include the method of example 1 or some other example herein, wherein the DC network is an NE-DC network and the LTE maximum transmission power is based on $$\hat{P}_{CMAX}^{LTE} = \begin{cases} \hat{P}_{min}^{LTE} & \text{Type-1 uplink subframes} \\ \hat{P}_{LTE} & \text{Type-2 uplink subframes} \end{cases}$$

$$\hat{P}_{min}^{LTE} = \gamma_{LTE} \cdot \hat{P}_{LTE},$$

where $\hat{P}_{CMAX}^{LTE}$ is the LTE maximum transmission power for LTE component carriers (CCs), $\hat{P}_{min}^{LTE}$ is a minimum guaranteed transmission power for LTE CCs, and $\hat{P}_{LTE}$ is a maximum transmit power for LTE CCs as configured by radio resource control (RRC) signaling.

Example 11 may include the method of examples 1 or some other example herein, wherein the DC network is an EN-DC network and the LTE maximum transmission power is based on:

$$\hat{P}_{CMAX}^{LTE} = \begin{cases} \hat{P}_{Total}^{EN-DC} - \hat{P}_{min}^{NR} & \text{Type-1 } LTE \text{ uplink subframes} \\ \hat{P}_{LTE} & \text{Type-2 } LTE \text{ uplink subframes} \end{cases},$$

where $\hat{P}_{CMAX}^{LTE}$ is the LTE maximum transmission power for LTE component carriers (CCs), $\hat{P}_{min}^{NR}$ is a minimum guaranteed transmission power for NR CCs, $\hat{P}_{Total}^{EN-DC}$ is a maximum transmit power for the DC network, and $\hat{P}_{LTE}$ is a maximum transmit power for LTE CCs as configured by radio resource control (RRC) signaling.

Example 12 may include the method of example 1 or some other example herein, wherein the DC network is an NE-DC network and the NR maximum transmission power is based on:

$$\hat{P}_{CMAX}^{NR} = \begin{cases} \hat{P}_{Total}^{NE-DC} - \hat{P}_{SCG} & \text{Type-1 uplink slots} \\ \hat{P}_{NR} & \text{Type-2 uplink slots} \end{cases}$$

where $\hat{P}_{CMAX}^{NR}$ is the NR maximum transmission power for NR component carriers (CCs), $\hat{P}_{Total}^{NE-DC}$ is a maximum transmit power for the DC network, $\hat{P}_{NR}$ is a maximum transmit power for NR CCs as configured by radio resource control (RRC) signaling, and $\hat{P}_{SCG}$ is an actual transmission power of a secondary cell group (SCG).

Example 13 may include the method of example 1 or some other example herein, wherein the method further comprises: determining a value of an LTE or NR power scaling factor is larger than a predetermined threshold; and dropping a corresponding NR or LTE transmission based on said determination that the value is larger than the predetermined threshold.

Example 14 may include the method of example 13 or some other example herein, wherein the predetermined threshold is specific to a type of transmission, wherein the type is a sounding reference signal, physical uplink control channel, or physical uplink shared channel.

Example 15 may include a method of operating a UE, the method comprising: storing a UE capability indication to indicate support of a power reduction based on a maximum timing difference between uplink grants in a dual connectivity network; encoding, for transmission to an access node, the UE capability indication in a message; determining a New Radio (NR) uplink is to overlap with a Long Term Evolution (LTE) uplink; determining whether a timing between reception of an NR uplink grant that schedules the NR uplink and an LTE uplink grant that schedules the LTE uplink is less than a predetermined timing threshold; and determining an uplink transmit power for the NR uplink or the LTE uplink based on said determination of whether the timing is less than the predetermined timing threshold.

Example 16 may include the method of example 15 or some other example herein, wherein the predetermined timing threshold is equal to a physical uplink shared channel (PUSCH) scheduling latency in LTE minus a UE processing capability for PUSCH preparation in NR.

Example 17 may include the method of example 15 or some other example herein, further comprising generating a power headroom report to be sent to an access node.

Example 18 may include the method of example 17 or some other example herein, wherein the power headroom report is determined independent of the NR uplink if the timing is greater than the predetermined timing threshold.

Example 19 may include a method of operating a UE, the method comprising: determining a timing threshold; determine a New Radio (NR) uplink is to overlap with a Long Term Evolution (LTE) uplink; determining whether a timing between reception of an NR uplink grant that schedules the NR uplink and an LTE uplink grant that schedules the LTE uplink is less than the timing threshold; and determining an uplink transmit power for the NR uplink or the LTE uplink based on said determination of whether the timing is less than the timing threshold.

Example 20 may include the method of example 19 or some other example herein, wherein determining the uplink transmit power comprises determining a transmit power for an LTE uplink: based on the NR uplink if the timing is less than the timing threshold; or independent of the NR uplink if the timing is greater than the timing threshold.

Example 21 may include one or more non-transitory computer-readable media comprising instructions to cause an electronic device, upon execution of the instructions by one or more processors of the electronic device, to perform one or more elements of a method or CRM described in or related to any of examples 1-20, or any other method or process described herein.

Example 22 may include an apparatus comprising logic, modules, and/or circuitry to perform one or more elements of a method or CRM described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer-readable media comprising instructions that, when executed by the one or more processors, cause the one or more processors to perform the method, techniques, or process as described in or related to any of examples 1-20, or portions thereof, or otherwise described in the present disclosure. The one or more computer-readable media may be one transitory or non-transitory computer-readable media.

Example 25 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-20, or portions thereof, or otherwise described in the present disclosure.

Example 26 includes a signal as described in or related to any of examples 1-20, or portions or parts thereof, or otherwise described in the present disclosure.

Example 27 includes a signal in a wireless network as shown and described in the present disclosure, or otherwise described in the present disclosure.

Example 28 includes a method of communicating in a wireless network as shown and described in the present disclosure.

Example 29 includes a system for providing wireless communication as shown and described in the present disclosure.

Example 30 includes a device for providing wireless communication as shown and described in the present disclosure.

Example 31 includes a packet, frame, segment, protocol data unit (PDU), or message as described in or related to any of examples 1-20, or portions or parts thereof, or otherwise described in the present disclosure.

What is claimed is:

1. One or more non-transitory computer-readable media (CRM) comprising instructions that, when executed by one or more processors of a user equipment (UE), cause the UE to:
   determine a set of power control parameters that includes a Long Term Evolution (LTE) maximum power ($P_{LTE}$) and a New Radio (NR) maximum power ($P_{NR}$);
   determine an uplink subframe type for an LTE subframe based on a potential of overlapping transmissions with an NR uplink signal of a dual connectivity (DC) network;
   determine an uplink slot type for an NR slot based on a potential of overlapping transmissions with an LTE uplink signal of the DC network; and
   determine an NR maximum transmission power and an LTE maximum transmission power based on the uplink subframe type, the uplink slot type, and the set of power control parameters; and
   transmit, in the DC network, signals in the LTE subframe based on the LTE maximum transmission power, and the NR slot based on the NR maximum transmission power, wherein the DC network is an Evolved Universal Terrestrial Radio Access—New Radio dual connectivity (EN-DC) network or a New Radio—Evolved Universal Terrestrial Radio Access dual connectivity (NE-DC) network.

2. The one or more non-transitory CRM of claim 1, wherein:
   the uplink subframe type is a Type-1 uplink subframe if there is a potential of overlapping transmissions with the NR uplink signal, or a Type-2 uplink subframe if there is not a potential of overlapping transmissions with the NR uplink signal; and
   the uplink slot type is a Type-1 uplink slot if there is a potential of overlapping transmissions with the LTE uplink signal, or a Type-2 uplink slot if there is not a potential of overlapping transmissions with the LTE uplink signal.

3. The one or more non-transitory CRM of claim 2, wherein the instructions, when executed, further cause the UE to: determine the uplink slot type is a Type-1 uplink slot based on a downlink control information (DCI) format 0_0, 0_1, or 2_0.

4. The one or more non-transitory CRM of claim 2, wherein the instructions, when executed, further cause the UE to determine: the uplink subframe type is a Type-1 uplink subframe based on a determination that the LTE subframe includes at least one symbol that is potentially overlapped with the NR uplink signal; or the uplink slot type is a Type-1 uplink slot based on a determination that the NR slot includes at least one symbol that is potentially overlapped with the LTE uplink signal.

5. The one or more non-transitory CRM of claim 2, wherein the instructions, when executed, further cause the UE to: determine the uplink subframe type is the Type-2 uplink subframe and further determine $\hat{P}_{LTE}$ as the maximum transmission power for the Type-2 uplink subframe based on said determination that the uplink subframe type is the Type-2 uplink subframe; or determine the uplink slot type is the Type-2 uplink slot and further determine $\hat{P}_{NR}$ as the maximum transmission power for the Type-2 uplink slot based on said determination that the uplink slot type is the Type-2 uplink slot.

6. The one or more non-transitory CRM of claim 2, wherein the uplink subframe type is the Type-1 uplink subframe and the uplink slot type is the Type-1 uplink slot and the instructions, when executed, further cause the UE to:
    determine the LTE maximum transmission power for the Type-1 uplink subframe.

7. The one or more non-transitory CRM of claim 6, wherein the instructions, when executed, further cause the UE to: determine the NR maximum transmission power for the Type-1 uplink slot based on the LTE maximum transmission power.

8. The one or more non-transitory CRM of claim 1, wherein the instructions, when executed, further cause the UE to determine the uplink subframe type or the uplink slot type based on an uplink/downlink configuration given by higher-layer signaling for an LTE frame structure or based on uplink slots indicated by higher-layer parameters TDD-UL-DLConfigurationCommon or TDD-UL-DL-ConfigDedicated for an NR frame structure.

9. The one or more non-transitory CRM of claim 1, wherein the instructions, when executed, further cause the UE to determine the uplink subframe type or the uplink slot type based on explicit subframe/slot type signaling from an access node.

10. The one or more non-transitory CRM of claim 1, wherein the DC network is the NE-DC network and the LTE maximum transmission power is based on:

$$\hat{P}_{CMAX}^{LTE} = \begin{cases} \hat{P}_{min}^{LTE} & \text{Type--1 uplink subframes} \\ \hat{P}_{LTE} & \text{Type--2 uplink subframes} \end{cases}$$

$$\hat{P}_{min}^{LTE} = \gamma_{LTE} \cdot \hat{P}_{LTE},$$

where $\hat{P}_{CMAX}^{LTE}$ is the LTE maximum transmission power for LTE component carriers (CCs), $\hat{P}_{min}^{LTE}$ is a minimum guaranteed transmission power for LTE CCs, and $\hat{P}_{LTE}$ is a maximum transmit power for LTE CCs as configured by radio resource control (RRC) signaling.

11. The one or more non-transitory CRM of claim 1, wherein the DC network is the EN-DC network and the LTE maximum transmission power is based on:

$$\hat{P}_{CMAX}^{LTE} = \begin{cases} \hat{P}_{Total}^{EN-DC} - \hat{P}_{min}^{NR} & \text{Type--1 uplink subframes} \\ \hat{P}_{LTE} & \text{Type--2 uplink subframes} \end{cases},$$

where $\hat{P}_{min}^{NR}$ is the LTE maximum transmission power for LTE component carriers (CCs), $\hat{P}_{min}^{NR}$ is a minimum guaranteed transmission power for NR CCs, $\hat{P}_{Total}^{EN-DC}$ is a maximum transmit power for the DC network, and $\hat{P}_{LTE}$ is a maximum transmit power for LTE CCs as configured by radio resource control (RRC) signaling.

12. The one or more non-transitory CRM of claim 1, wherein the DC network is the NE-DC network and the NR maximum transmission power is based on:

$$\hat{P}_{CMAX}^{NR} = \begin{cases} \hat{P}_{Total}^{NE-DC} - \hat{P}_{SCG} & \text{Type--1 uplink slots} \\ \hat{P}_{NR} & \text{Type--2 uplink slots} \end{cases}$$

where $\hat{P}_{CMAX}^{NR}$ is the NR maximum transmission power for NR component carriers (CCs), $\hat{P}_{Total}^{NE-DC}$ is a maximum transmit power for the DC network, $\hat{P}_{NR}$ is a maximum transmit power for NR CCs as configured by radio resource control (RRC) signaling, and $\hat{P}_{SCG}$ is an actual transmission power of a secondary cell group (SCG).

13. The one or more non-transitory CRM of claim 1, wherein the instructions, when executed, further cause the UE to:
    determine a value of an LTE or NR power scaling factor is larger than a predetermined threshold; and
    drop a corresponding NR or LTE transmission based on said determination that the value is larger than the predetermined threshold.

14. The one or more non-transitory CRM of claim 13, wherein the predetermined threshold is specific to a type of transmission, wherein the type is a sounding reference signal, physical uplink control channel, or physical uplink shared channel.

15. A user equipment (UE), comprising:
    a memory to store a UE capability indication to indicate support of a power reduction based on a maximum timing difference between uplink grants in a dual connectivity network; and processing circuitry, coupled with the memory, to:
        encode, for transmission to an access node, the UE capability indication in a message;
        determine a New Radio (NR) uplink to overlap with a Long Term Evolution (LTE) uplink;
        determine whether a timing between reception of an NR uplink grant that schedules the NR uplink and an LTE uplink grant that schedules the LTE uplink is less than a predetermined timing threshold; and
        determine an uplink transmit power for the NR uplink or the LTE uplink based on said determination of whether the timing is less than the predetermined timing threshold.

16. The UE of claim 15, wherein the predetermined timing threshold is equal to a physical uplink shared channel (PUSCH) scheduling latency in LTE minus a UE processing capability for PUSCH preparation in NR.

17. The UE of claim 15, wherein the processing circuitry is further to generate a power headroom report to be sent to the access node.

18. The UE of claim 17, wherein the power headroom report is determined independent of the NR uplink if the timing is greater than the predetermined timing threshold.

19. One or more non-transitory computer-readable media having instructions that, when executed by one or more processors, cause a user equipment (UE) to:
    determine a timing threshold;
    determine a New Radio (NR) uplink to overlap with a Long Term Evolution (LTE) link;
    determine whether a timing between reception of an NR uplink grant that schedules the NR uplink and an LTE uplink grant that schedules the LTE uplink is less than the timing threshold;
    determine an uplink transmit power for the NR uplink or the LTE uplink based on said determination of whether the timing is less than the timing threshold; and
    wherein to determine the uplink transmit power, the UE is to determine a transmit power for the LTE uplink:
        based on the NR uplink if
        the timing is less than the timing threshold, or
        independent of the NR uplink if the timing is greater than the timing threshold.

20. The one or more non-transitory computer-readable media of claim 19, wherein the timing threshold is equal to a physical uplink shared channel (PUSCH) scheduling latency in LTE minus a UE processing capability for PUSCH preparation in NR.

* * * * *

UNITED STATES PATENT AND TRADEMARK OFFICE
CERTIFICATE OF CORRECTION

PATENT NO. : 11,622,337 B2
APPLICATION NO. : 17/282735
DATED : April 4, 2023
INVENTOR(S) : Gang Xiong et al.

Page 1 of 1

It is certified that error appears in the above-identified patent and that said Letters Patent is hereby corrected as shown below:

In the Claims

Claim 11, Column 19, Line 49 "where $P^{\wedge}\_min^{\wedge}(NR)$ is the LTE maximum" should read ---$P^{\wedge}\_CMAX^{\wedge}LTE$ is the LTE maximum---.

Signed and Sealed this
First Day of August, 2023

Katherine Kelly Vidal
*Director of the United States Patent and Trademark Office*